United States Patent Office 3,317,136
Patented May 2, 1967

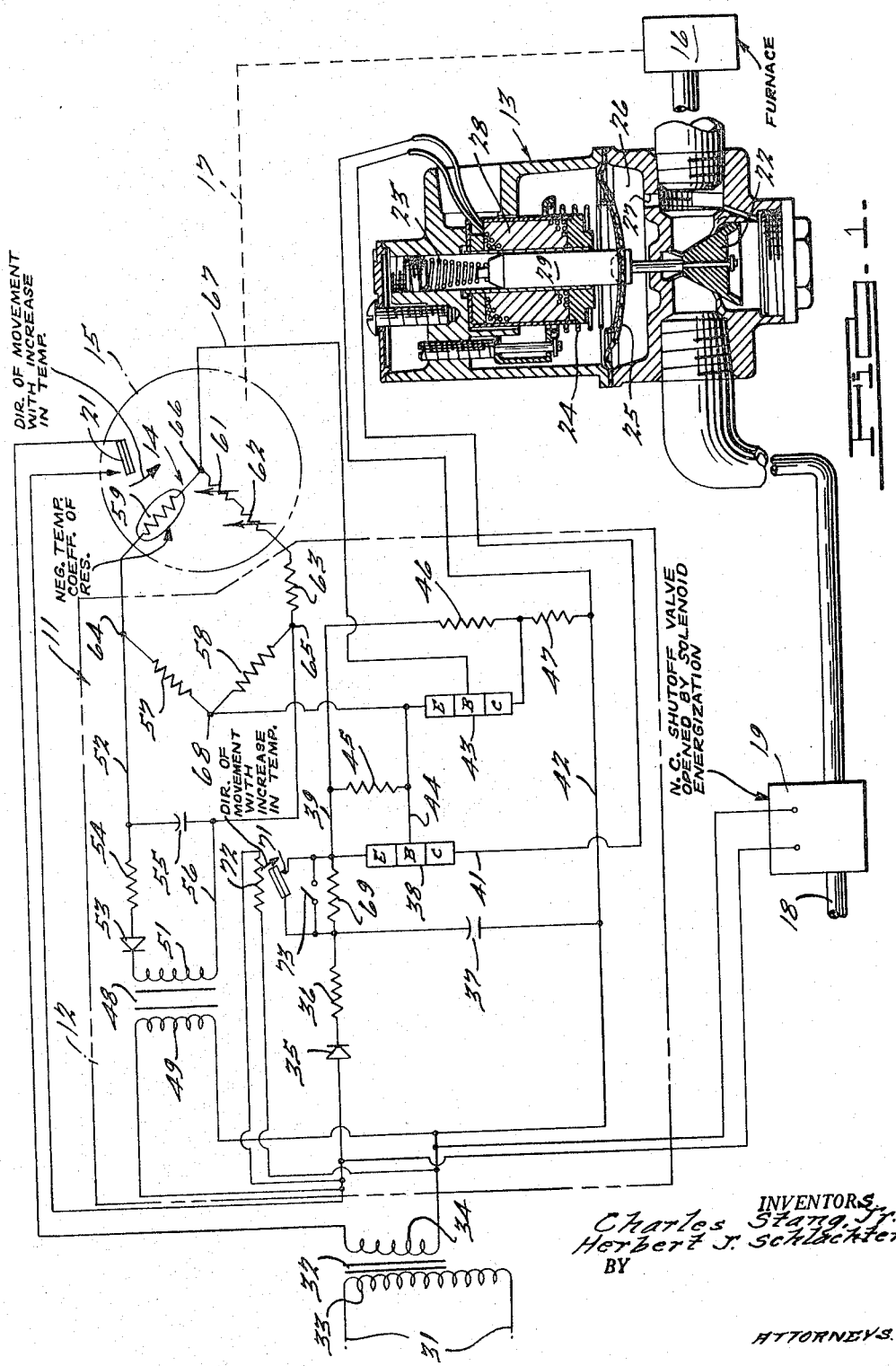

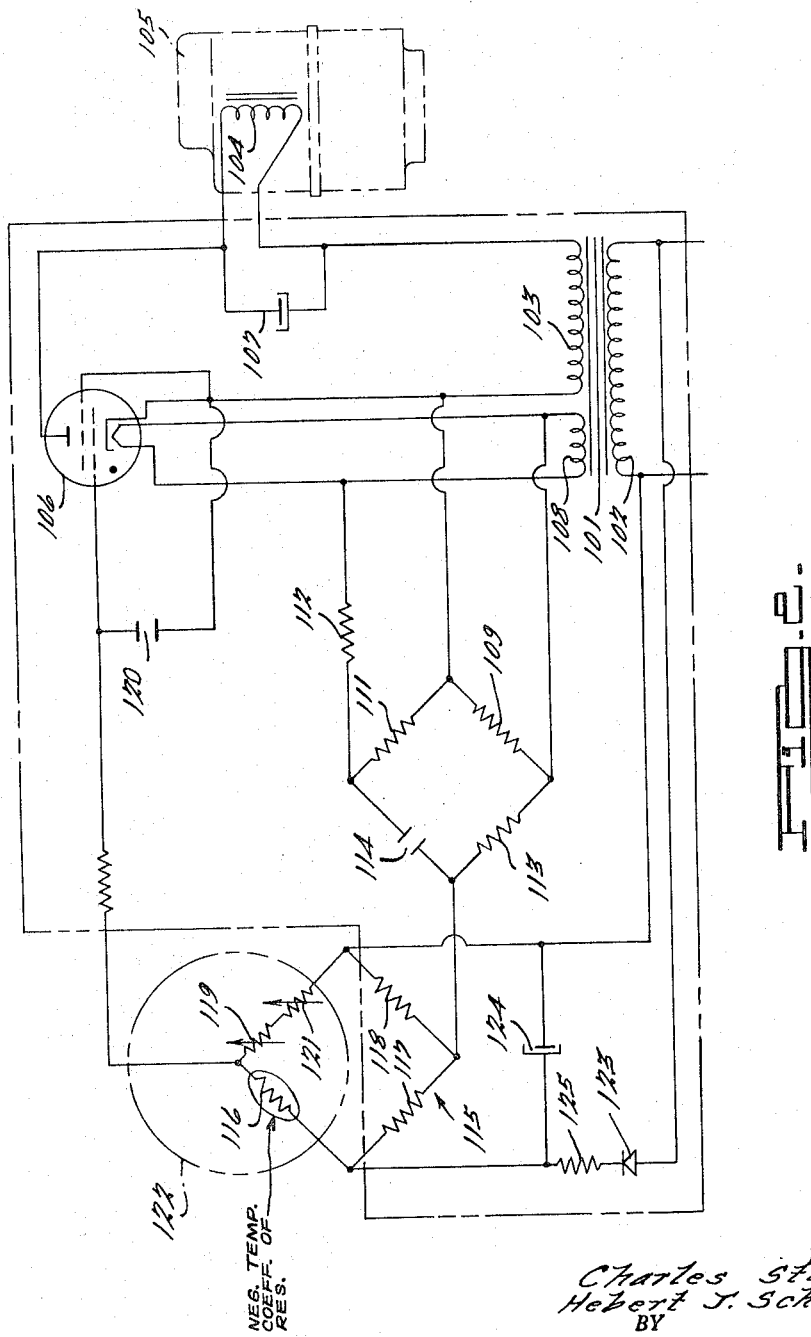

---

3,317,136
THERMOSTATIC GAS FLOW CONTROL MEANS
Charles Stang, Jr., and Herbert J. Schlachter, Detroit, Mich., assignors to Maxitrol Company, Southfield, Mich., a corporation of Michigan
Filed June 9, 1965, Ser. No. 482,960
4 Claims. (Cl. 236—78)

This application is an continuation-in-part of our copending application Ser. No. 267,043, filed Mar. 21, 1963, which is a continuation of our application Ser. No. 828,792, filed July 22, 1959, which, in turn, is a continuation-in-part of our application Ser. No. 756,375, filed Aug. 21, 1958, all being assigned to the assignee of the present application and all having been abandoned.

This invention relates to a heating system and control means therefor.

It is an object of the present invention to provide an improved electrical control arrangement especially adapted for the sensitive and accurate condition-responsive modulation of a gas regulator or other valve operating at relatively low inlet pressures.

It is an object of the present invention to provide an improved heat control system for space heating application.

It is another object of the present invention to provide an improved heat control system for space heating utilizing forced air apparatus.

It is another object of the present invention to provide an improved heat control system for space heating which system includes a novel valve construction.

It is also an object to provide an improved control system of this nature, which is of economical and trouble-free construction and may be installed in a wide variety of positions either alone or in conjunction with limit switch means.

It is another object to provide an improved heat-sensitive control or modulating circuit which utilizes a thermistor or negative temperature coefficient resistance in a novel and advantageous manner.

It is a further object to provide a temperature-responsive control system of an improved type for modulating gas flow which can be adapted to start operation with full or unmodulated gas flow or with modulated flow of gas to a furnace.

It is another object of the invention to provide a novel and improved sensing and amplifying control circuit for gas modulating valves which will prevent the creation of major inaccuracies in calibration or loss of sensitivity in the sensing portion of the circuit when the amplified modulating current is being used during operation of the modulating valve.

It is still another object to provide an improved circuit of this nature which permits a substantially increased degree of sensitivity in the system so that changes in value of the unit being controlled may be kept to a minimum.

It is also an object to provide an amplifying circuit of this character in which current ripple produced by the presence of rectifying means is kept to a minimum, thus contributing to the sensitivity and accuracy of the system.

Other objects, features and advantages of the present invention will become apparent from the subsequent description, taken in conjunction with the accompanying drawings, in which:

FIGURE 1 is an electrical circuit diagram showing a preferred form of the amplifying circuit combined with a modulator valve, the amplifying elements being in transistor form; and FIGURE 2 is a circuit diagram of the modified form of the invention using thyratron amplifying means.

Among the disadvantages of present day systems for space heating has been the requirement that the heating equipment be sufficient to overcome the severest weather conditions which may be encountered, this capacity being utilized only a small percentage of the time. Due to the inflexibility of such system capacity, the conventional heating system will constantly cycle on and off, as controlled by a thermostat, during normal winter periods. Besides the greater wear which such continuous cycling imposes on the system, air temperatures in the heated space during "off" portions of the cycle will tend to become uneven, causing discomfort of the occupants.

With these systems the temperature of the room or space to be heated is attempted to be controlled by a conventional thermostat. At any one setting of the thermostat there will be one temperature at which the thermostat will operate to open a valve and turn the system "on" and another, higher temperature at which the thermostat will operate to close the valve and turn the system "off." Since the valve has only one opened position, in turning the large capacity furnace "on," the gas flow to the furnace normally will be the same regardless of the requirements of the space to be heated and hence the temperature of the heated air transmitted from the furnace to the space to be heated will be the same regardless of the requirements of that space. The inertia of this type of system is substantial such that normally there is the tendency to overshoot the high temperature setting of the thermostat resulting in a final temperature higher than the selected temperature. Thus the high and low temperature spread obtained in the space to be heated can become substantial, causing discomfort to the individuals present. As will be seen, in the present invention the conventional thermostat and valve which it controls when combined with additional control apparatus provide a new and improved system in which the inertial effects are minimized and in which objectionable temperature variations are substantally eliminated.

In general terms, the invention comprises a sensing, amplifying and adjusting circuit for use in conjunction with a current carrying unit, the current value of which is to be continuously modulated in accordance with changes in condition, such as the temperature of a room. Such a device is shown and described in the aforementioned copending application (Ser. No. 756,375) as comprising a gas regulator valve which incorporates means for maintaining a constant output pressure leading to a gas burner even though the supply pressure of the gas may vary. A modulating control in the form of an electrical coil is incorporated in the valve construction, the coil varying the standard force against which the regulating controls act in accordance with temperature changes.

Looking now to FIGURE 1, the system is generally indicated at 11 and comprises an amplifier section 12, a modulating and regulating valve generally indicated at 13 and a sensing section generally indicated at 14 which may be located in a room 15, this room being heated by a furnace 16 through a connection indicated schematically at 17. The furnace may be supplied with gas from a supply line 18 in which is located a shut-off valve 19 controlled by a thermostat 21 in a manner described below, valve 19 having a coil which maintains the valve in open position when energized. Valve 13 is also located in line 18 and is adapted to regulate the pressure of gas flowing to furnace 16 so as to maintain this pressure at a substantially constant value despite variations in supply pressure.

As will be seen, the valve 13 is constructed such as to have generally an infinite number of openings between a wide open position and a preselected minimum opening position whereby the gas flow to the furnace 16 is varied. The preselected minimum opening position has a dual significance to be described. In operation the desired temperature is selected in the usual manner via the thermostat 21. Assuming now that the room temperature is below the selected temperature, the thermostat will operate to open the shutoff valve 19 whereby gas at the full pressure in line 18 is transmitted therethrough. The sensing section 15 in addition to including the thermostat 21 includes additional means for sensing the temperature in the space to be heated which means is operative in conjunction with the amplifier section 12 to provide an output signal having a magnitude which varies in accordance with variations in the difference between the temperature of the heated space and that which is selected. If this difference is great the signal will have a minimum magnitude resulting in the modulating valve 13 having its maximum opening at which the maximum flow of gas to the furnace 16 will occur; in this condition the furnace 16 will be operating at its maximum capacity and the maximum amount of heat will be delivered to the space to be heated. However, as the temperature differential decreases, i.e., between the selected temperature and the temperature of the space to be heated, the magnitude of the signal increases resulting in the modulating valve 13 being closed a corresponding amount; in this condition the furnace 16 will be operating at only a portion of its capacity and a lesser amount of heat will be delivered to the space to be heated. The above process will continue with the furnace 16 delivering lesser amounts of heat as the selected and actual temperatures near coincidence. Thus, as the desired temperature is attained and the thermostat 21 operates to close the valve 19 the amount of heat being delivered from the furnace 16 is at a minimum; hence there will be little or no overshooting since the inertia of the system will be at a minimum. As the temperature of the space to be heated drops to that point at which the thermostat 21 operates to open the valve 19 the temperature differential, i.e., between the selected and actual temperatures, will be slight and hence the modulating valve 13 will be substantially at its minimum opening; in this condition the amount of heat delivered from the furnace 16 will be at a minimum, thus assuring no overshooting. With the above system the furnace 16 will be "on" for substantially longer periods than furnaces operated by conventional systems. Note that with the system of the present invention, the thermostat 21 becomes a much more precise control element and will control the temperature in the space to be heated much more exactly with reference to the temperature selected. As will be noted, the valve 13 and amplifier section 12 are constructed such that valve 13 is placed in the preselected minimum opening condition prior to attainment of the temperature selected; this is an important feature of the present invention and insures that the temperature selected will be reached gradually without overshooting.

The modulating valve 13, as previously noted, is varied from a maximum wide open position to a preselected minimum position. This minimum position is carefully selected to permt just a sufficient amount of gas to flow to the furnace 16 whereby as the selected and actual temperatures near coincidence the amount of heat added to the space will be sufficient to increase the temperature but still at a level whereby overshooting is prevented. The minimum position also is selected to be a sufficient opening whereby any backfiring from the furnace 16 is prevented. The minimum position also is selected such as to provide adequate pressure for starting or igniting. Thus the preselected minimum position is carefully selected to satisfy all of the above requirements. As will be seen, means can be provided whereby the valve 13 is opened to its maximum for starting purposes.

The system of the present invention is primarily for use with a forced air system; thus the system is capable of providing the instant heating characteristics of forced air to bring a room quickly up to temperature but will do so in a manner eliminating temperature overshooting and the inherent discomfort caused thereby. In this system the blower motor will be running more continuously than in conventional systems and hence wear due to frequent starting and stopping of conventional systems is eliminated.

The valve 13 comprises a valve member 22 movable between an upper position restricting gas flow to a preselected minimum and a lower position permitting maximum flow, the flow between these positions being proportional to the valve position. The valve is urged toward its fully open position by springs 23 and 24 which are adjustable, as described more specifically in the aforementioned application Ser. No. 756,375, to preselect the maximum and minimum standard force values. The valve is urged to its closed position by a diaphragm 25 on one side of a chamber 26 connected to the valve by a port 27. The regulating function of the valve is thus achieved by partially closing the valve by the greater pressure in chamber 26 when outlet pressure increases, and permitting the valve to move downwardly when the outlet pressure decreases.

More specifically a coil 28 has a plunger 29 mounted for reciprocable movement therein with the lower end of the plunger 29 engaging a plate located contiguously with the diaphragm 25. The plunger 29 is not secured to that plate but is free to separate itself therefrom upon being moved upwardly by an electromagnetic force exerted upon it by the coil 28. The plunger 29 is urged downwardly by the spring 23 which has one end against the plunger 29 and its opposite end against a first stop which can be adjusted to vary the bias of spring 23. Thus the spring 23 normally maintains the valve member 22 in its opened position. Note that spring 24 acts on the diaphragm 25, independently of spring 23, to also urge the valve member 22 to its opened position. The spring 24 has one end against the plate on the diaphragm and its other end against a second stop which can be adjusted to vary the bias of spring 24. Should a temperature rise cause current to flow in coil 28 the upward force on plunger 29 will move the plunger 29 upwardly against the force of spring 23 and the diaphragm 25 will move the valve member 22 upwardly toward its closed position. Should the current in the coil 28 increase to a point where plunger 29 is lifted away from diaphragm 25 the downward or opening force on diaphragm will be exerted solely by by spring 24 and with this minimum opening force will determine the minimum valve opening.

The modulating function of the valve 13 is intended to permit continuous furnace operation at less than maximum furnace output rather than intermittent starting and stopping of the furnace as in conventional installations. The purposes and advantages of this modulating arrangement have been previously discussed and are additionally set forth in the aforementioned application Ser. No. 756,375. The modulating arrangement includes a coil 28 surrounding a plunger 39 which is urged downwardly by spring 23 against diaphragm 25. An increase in current in coil 28 will thus cause a greater upward pull on plunger 29, relieving the force exerted on the diaphragm to a degree proportional to the current value. The control circuit is so arranged that at a predetermined low tempeature in room 15 no current will flow though coil 28. As the temperature increases from this predetermined minimum, an increasing modulating current will flow through coil 28, the amount of this current being proportional to the temperature sensed by sensing elements 14. At the point of coincidence between the selected temperature and temperature of the heated space, the current to coil 28 will be a maximum reducing the opening through valve 13 to a preselected minimum opening; at this minimum, opening the gas pressure to furnace 16 is still sufficient to insure proper burning, i.e., without back fire, etc., and, of course, is such that the output of the furnace 16 is a minimum to prevent overshoot. In the event that main valve 19 is caused to be turned off by thermostat 21 and then turned on again, the preselected minimum opening is sufficient to insure starting or ignition. Note that even at the minimum opening regulation continues.

The modulating control circuit includes a sensing element in th eform of a thermistor of negative temperature coefficient resistance which may be mounted in the room being heated or in any other appropriate location, this thermistor being part of a bridge network. An amplifying circuit in the form of a plurality of transistors or a thyratron is controlled by this sensing bridge. In accordance with the principles of the invention, the drawing of current by the amplifier portion of the circuit during operation will not affect the stability or sensitivity of the sensing portion of the circuit. In a preferred form of the invention, no portion of the bridge circuit is connected to ground, but the bridge circuit is supplied by an isolation transformer which is separate from the supply circuit for the amplifying portion of the system. The arrangement also permits the connection between the sensing and amplifier portions of the circuit to be such as to achieve maximum sensitivity of the system and to minimize ripple voltages which might affect operation.

The circuit is supplied by a current source 31 which may be 110 volts A.C., this current source being connected to a transformer 32 having a primary coil 33 and a secondary coil 34. The secondary coil may supply a lower output voltage, this arrangement being the normal requirement in home heating systems. Thermostatic switch 21 may be connected in series with the secondary winding 34, so that shut-off valve 19, the coil of which is across winding 34, will be closed when the temperature reaches a predetermined high value and switch 21 is opened, and current supply to the sensing and amplifying circuit will also be cut off. A rectifier 35 and a surge limiting resistor 36 are also placed in series with transformer winding 34, while a capacitor 37 is placed across the secondary line to filter the half-wave current and yield a smoother voltage.

A transistor 38 is placed across the line of secondary coil 34 in series with coil 28 of valve 13. More particularly, the emitter of transistor 38 is connected to wire 39 leading from resistor 36 while the collector is connected by a wire 41 to coil 28, the other end of the coil being connected by a wire 42 to the other side of coil 34. Transistor 38 may be termed a power transistor, and is controlled by a control transistor 43, the emitter of which is connected to the base of transistor 38 by a wire 44. Wire 44 is connected to wire 39 by a resistor 45 which lowers the current leakage through the load when no signal is being received by transistor 38. The collector of transistor 43 is connected to wire 39 by a resistor 46 which reduces the voltage impressed across transistor 43, and is connected to wire 42 by a current limiting resistor 47.

The sensing portion of the circuit is supplied by a separate or isolated transformer 48 having a primary coil 49 connected across wires 39 and 42 and a secondary coil 51 leading to sensing elements 14. Wire 52 leading from one side of coil 51 has a rectifier 53 and a surge limiting resistor 54 in series, the rectifier being filtered by a capacitor 55 connected across lines 52 and 56 of secondary coil 51. The sensing elements are arranged in a bridge circuit which comprises a pair of resistors 57 and 58 as well as a sensing element in the form of a thermistor 59 and adjustable rheostats 61 and 62. In practice, it may be desirable to mount thermistor 59 together with rheostats 61 and 62 in a common enclosure mounted in room 15. Rheostat 61 may be adjustable by the occupant of the room with rheostat 62 being a calibration rheostat. A resistor 63 of fixed value may be placed in series with rheostats 61 and 62 if desired. Line 52 is connected to the junction between resistor 57 and thermistor 59, this junction being indicated at 64. Line 56 may be connected to the junction 65 between resistors 58 and 63. Junction 66 between thermistor 59 and rehostat 61 is connected by a wire 67 to the base of control transistor 43, while junction 68 between resistors 57 and 58 is connected by a wire to the emitter of transistor 43.

In operation, thermistor 59, which has a negative temperature coefficient of resistance, will vary its resistance in accordance with the temperature in room 15. Originally, calibration rheostat 62 and temperature selector rheostat 61 may be set so that at a given minimum room temperature, the resistance ratio of resistor 59 and resistors 61, 62 and 63 will be equal to the ratio of resistors 57 and 58, so that there will be no signal voltage between terminals 66 and 68. There will thus be no current flow through transistor 43 and no signal to transistor 38. Thus, modulator coil 28 will carry no current and valve 13 will perform a normal regulating function while the gas is flowing to furnace 16 with valve 13 being wide open.

Should the temperature in the room rise slightly, the resistance of thermistor 59 will be reduced, unbalancing the bridge circuit and causing a potential difference to appear between terminals 66 and 68. This will cause current to flow through transistor 43 and will result in a signal to transistor 38 which will permit current flow through coil 28. This in turn will exert a modulating force in valve 13, reducing the standard force against which diaphragm 25 operates. The flow of gas will thus be reduced, the regulating function of the valve still being continued but at a lower value. Similarly, should the temperature in room 15 drop, the rising resistance of thermistor 59 will reduce the current flow through valve 38 and thus reduce the modulating force. When the room temperature increases to the point at which the thermostatic switch 21 is set, it will operate to deenergize the control system and cause valve 19 to close and shut off the gas flow. It should be understood of course that the specific details of the thermostatic switch and cutoff valve in themselves do not form part of the present invention. Note that the thermostatic switch 21 combines with the other apparatus to provide a "failsafe" type of system. For example, if upon opening of the valve 19 no current is delivered to the coil 28 from the control circuit, the valve 13 will be wide open and the system will behave as a conventional system with sole control by the thermostat 21.

While starting or ignition can be effectuated with the valve 13 in its minimum open position it may be desirable to have full pressure available for starting. Thus in some cases it may be desired that upon reclosure of thermostatic switch 21 and reopening of valve 19, valve 13 permits full and unmodulated gas flow to furnace 16 for a short initial period of time in order that the gas may be properly ignited. One way of obtaining such initial unmodulated flow is by placing an additional resistor 69 in series with resistor 36 and resistor 38, resistor 69 having a shunt circuit in which is located a thermostatic switch 71. This switch is normally in its open position when cold, but when heated by an element 72 connected to secondary coil 34, switch 71 will close to bypass resistor 69. This resistor will serve to substantially reduce the current flowing through coil 28, at least partially canceling the modulating effect of the coil and permitting full gas flow until switch 71 closes. The characteristics of thermostatic switch 71 may of course be chosen to produce the desired time delay in a given circuit. If it is desired that gas flow be fully modulated from the beginning of the cycle, a manual switch 73 may be closed to bypass resistor 69.

The amplifying and signaling circuit described above has been found to offer considerable advantages over previously known arrangements of this type, especially when applied to gas modulating and regulating systems for heating purposes. In considering these advantages, the importance of accuracy, stability, and sensitivity of such circuits must be realized, since it is essential for optimum comfort and maintenance-free operation that the temperature variation in room 15 for any given setting of rheostat 61 be held to a minimum and be at a constant level at all times. It is also important to bear in mind that economy of construction becomes an important factor, especially when high production volume is involved.

One important feature of the present invention is the fact that the changes in current carried by the amplifier portion of the network, including coil 28, will not materially affect the stability, accuracy, and sensitivity of the sensing and signal portions of the circuit. Normally, the amplifier circuit portion will draw a much larger current than the sensing portion, especially when the current in coil 28 is at or near its full modulating value. By providing isolation transformer 48 which in effect isolates the bridge network, any changes in the voltage supply caused by such current changes in coil 28 will not have an unbalancing effect. This will be understood upon examination in FIGURE 1 wherein it will be seen that resistors 57 and 58, as well as the resistors in the other two legs of the bridge, are connected across secondary coil 51 without juncture 68 being connected to ground. Junctures 66 and 68 will thus remain at all times in stable relation with each other, their potential difference being effected solely by the change in resistance of thermistor 59 or by changes in setting of rheostats 61 or 62.

This stability of the bridge network will in turn prevent the signal circuit from losing its calibrated setting as the modulating current is increased, and will retain the sensitivity of thermistor 59 at all times. Isolation of the bridge network has a further advantage that a choice can be made for the reference points of junctures 66 and 68. In the illustrated embodiment for example, junction 68 is connected to the emitter of transistor 43 rather than the emitter of transistor 38. With this arrangement, the change in voltage required from one end of the range to the other will be much less than if the reference point of junction 68 were the emitter of transistor 38. Thus, the temperature of room 15 may be kept within much narrower temperature limits than would otherwise be the case.

Yet another advantage of the novel circuit described above is the fact that the quality of the direct current signal is relatively good, being free of any substantial ripple effect from the rectifier elements. This is because variations in D.C. signal caused by the presence of the rectifier elements will be impressed equally at junctions 66 and 68. Since the potential difference between these two junctions determines the effective signal received by the transistor 43, the arrangement will nullify any deleterious effect which the presence of the rectifier elements might otherwise create.

FIGURE 2 shows a modified electrical control arrangement which utilizes a thyratron tube in the power loop of the control circuit. This arrangement includes a transformer 101 having a primary coil 102 and a secondary coil 103 for supplying the current to a modulating coil 104 in a gas regulating and modulating valve 105. The current of secondary coil 103 is rectified to D.C. through a thyratron tube 106. This thyratron acts as a half-wave rectifier, a rectified current being filtered by a capacitor 107 connected in parallel with coil 104, with the resistance in coil 103 acting to provide the necessary surge resistance. The inductive reactance of coil 104 coupled with the filter network results in effective filtering, integration and averaging of the rectifier pulsations.

The magnitude of the current through coil 104 is modulated as a function of temperature by varying the firing point of the thyratron. To this end, an alternating voltage which is shifted in phase with respect to the anode voltage of thyratron 106 and a direct voltage having a magnitude which varies in accordance with sensed temperature are applied between the control grid and cathode of the thyratron.

The phase-shifted alternating voltage is derived from the alternating voltage appearing across a secondary winding 108 of transformer 101. This voltage is supplied through a voltage divider circuit comprising resistors 109, 111, and 112 to a phase-shifting network which includes a serially connected resistor 113 and a capacitor 114. The junction of these two elements is connected in series with the output of a bridge sensing circuit generally indicated at 115, this bridge circuit output connected to the control grid of the thyratron.

The bridge sensing circuit is comprised of a thermistor 116 in one leg, two resistors 117 and 118 in two opposite legs, and a manually adjustable potentiometer 119 as well as a calibrating potentiometer 121 in series in the remaining leg. Thermistor 116 may be so located as to be sensitive to temperature changes which are intended to control the modulating coil current, and potentiometers 119 and 121 may be located adjacent thermistor 116 in a control housing located in a room 122.

The input to the sensing bridge is derived from an alternating current power supply, or the connection may be made to the primary coil 102 of transformer 101. The current is rectified by a rectifier 123 and filtered by a capacitor 124, a surge resistor 125 being provided to reduce the initial surge current to capacitor 124. The output of sensing bridge 115 is in series with the phase-shifted A.C. voltage, the sum of these two voltages being applied across the cathode and control grid of the thyratron. A capacitor 120 may be provided to bypass surges induced from the thyratron anode. It should be noted that since the sensitivity of the circuit is inversely proportional to the A.C. component of the signal voltage the proper selection of this voltage permits operation of the circuit with only a single thermistor while maintaining adequate sensitivity.

In operation, thyratron 106 will be responsive to the instantaneous sum of the temperature-controlled direct voltage and the phase-shifted alternating voltage, a change of the sensed temperature producing a shift in the magnitude of that sum of voltages and a magnified change in the current to coil 104. By properly selecting the magnitude and slope of the alternating voltage, a slight change in direct voltage can be made to produce a considerable shift in the thyratron conduction point, thus providing an extremely sensitive temperature sensing circuit which incorporates advantages described above with respect to FIGURE 1.

It should be obvserved that the circuit of FIGURE 2 will inherently be one in which initial energization of the circuit, for example, by closure of a switch similar to switch 21 of FIGURE 1, will result in unmodulated or full gas flow during the initial or warmup period. This is because modulation cannot take place until the cathode of thyratron tube 106 has been heated.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a system for controlling the flow of gas to a gas burner at relatively low pressure, a gas supply line, a valve in said line, biasing means urging said valve to its open position, means responsive to the outlet pressure from said valve for urging the valve toward its closed position, a coil and armature for counteracting said biasing means with varying degrees of force proportional to the current carried by said coil, a sensing resistor having a high temperature coefficient of resistance, a source of alternating current, a periodically conductive controlled electronic rectifying device, means connecting said device and said coil in series with one another across said source of alternating current, and means for modulating the duration of each period of conductivity of said device in accordance with changes in resistance of said sensing resistor, said modulating means including an input circuit in which an alternating voltage which is shifted in phase with relation to said source of alternating current and a direct voltage, the magnitude of which is varied in accordance with the resistance of said sensing resistor are connected in series.

2. The combination according to claim 1, further provided with a bridge circuit including said sensing resistor, a source of direct current for energizing said bridge circuit, and means connecting the direct current from the output of said bridge circuit to said modulating means input circuit.

3. In a system for controlling the flow of a combustible gaseous heating medium at relatively low pressure, a gas conduit, a valve in said gas conduit, means urging said valve towards its open position, an electrical coil for urging the valve toward its closed position, a current supply source for said coil, an electrical valve in series with said coil for modulating the current therein, a signal bridge network having a pair of output junctions connected to said electrical valve for controlling the current therein, a supply source for said bridge network, at least one element in said bridge network being a negative temperature coefficient resistance, whereby the potential difference between said junctions may be varied, selective means for closing the connections between said supply sources and said coil and bridge network, and means for reducing the current to said coil for a predetermined time period upon closing of said connections.

4. In combination, a modulating coil, a current supply source for said coil, a sensing circuit, a current supply source for said sensing circuit, amplfying means responsive to current changes in said sensing circuit for controlling the current flowing through said coil, selective means for connecting said current sources to said coil and sensing circuits, current reducing means in said coil circuit, and time delay means responsive to closing of said selective means for bypassing said current reducing means after a predetermined period of time.

References Cited by the Examiner

UNITED STATES PATENTS

| | | | |
|---|---|---|---|
| 1,180,638 | 4/1916 | Fabian | 236—15 |
| 1,654,759 | 1/1928 | Shultz | 236—46 |
| 1,656,677 | 1/1928 | Neumann | 236—45 |
| 1,989,829 | 2/1935 | Specht | 236—78 |
| 2,121,657 | 6/1938 | Fisher | 251—129 X |
| 2,278,633 | 4/1942 | Bagnall | 236—69 X |
| 2,292,830 | 8/1942 | Gauger et al. | 236—1 |
| 2,511,981 | 6/1950 | Hanchett. | |
| 2,688,845 | 9/1954 | Ostroff | 251—130 X |
| 2,696,350 | 12/1954 | Cretzler | 236—75 |
| 2,730,618 | 1/1956 | Michaels. | |
| 2,872,595 | 2/1959 | Pinckaers. | |
| 2,924,387 | 2/1960 | Hajny | 236—1 |
| 2,935,262 | 5/1960 | Smith | 236—11 |
| 3,051,873 | 8/1962 | Jensen. | |

ROBERT A. O'LEARY, *Primary Examiner.*

ALDEN D. STEWART, *Examiner.*